Sept. 26, 1939.　　P. J. WIEZEVICH　　2,174,024
COMBINATION CRACKING AND POLYMERIZATION
Filed April 7, 1936
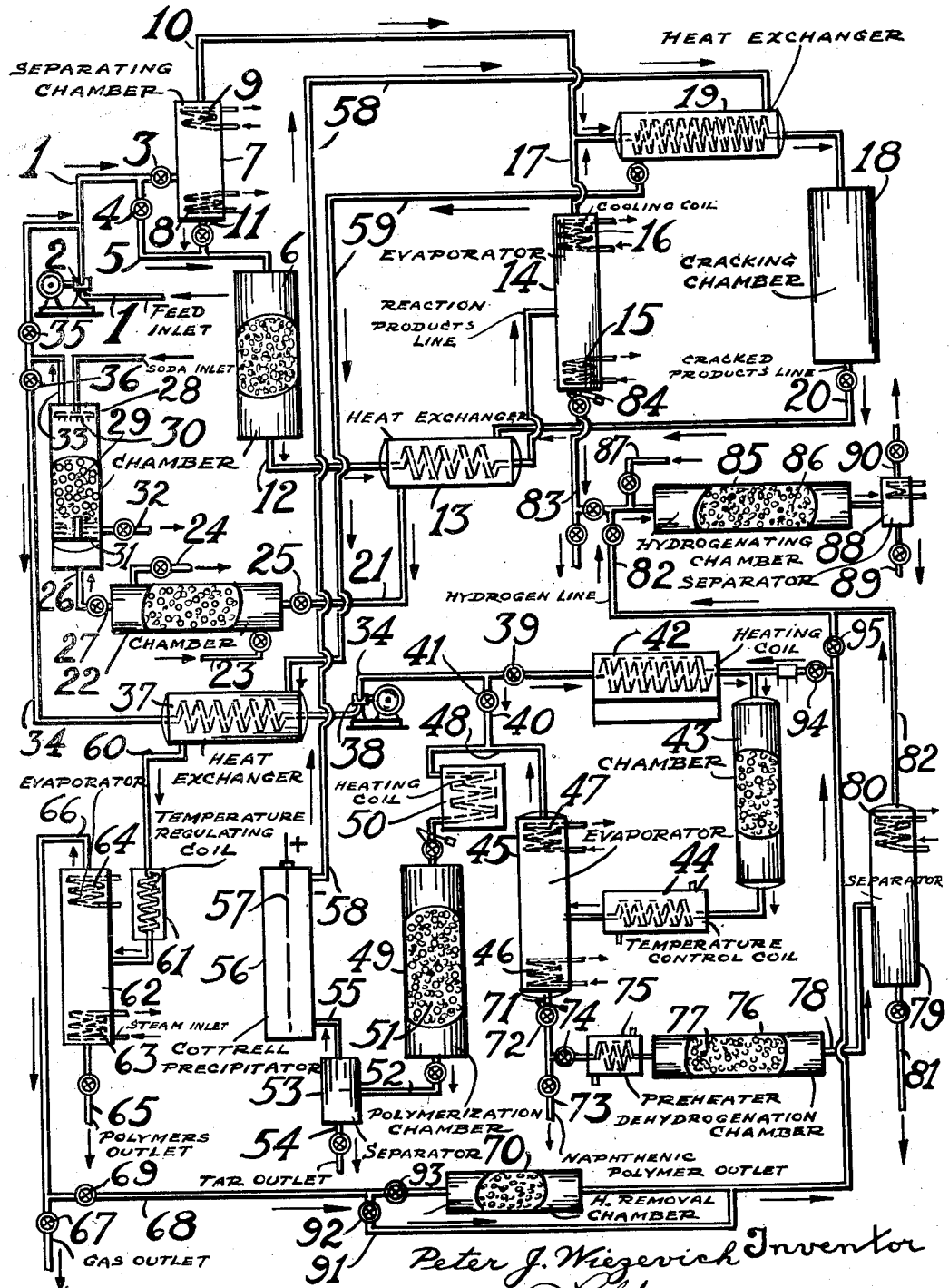
Peter J. Wiezevich Inventor
By P. L. Young Attorney Patented Sept. 26, 1939

2,174,024

UNITED STATES PATENT OFFICE 2,174,024

COMBINATION CRACKING AND POLYMERIZATION

Peter J. Wiezevich, Elizabeth, N. J., now by judicial change of name to Peter J. Gaylor, assignor to Standard Oil Development Company, a corporation of Delaware Application April 7, 1936, Serial No. 73,051

8 Claims. (Cl. 196—10)

The present invention is directed to the production of gasoline from normally gaseous hydrocarbons by combined cracking and polymerization. More especially, it is directed to the production of gasoline from the gaseous hydrocarbon mixture obtained as an undesirable by-product of the cracking of higher boiling hydrocarbons.

The main object of the present invention is the provision of a multi-stage treatment by means of which normally gaseous hydrocarbon mixtures, containing paraffinic and olefinic hydrocarbons of from 1 to 4 carbon atoms inclusive, can be converted in a more complete manner than possible by the methods hitherto practiced, into hydrocarbons of the gasoline boiling range. According to the present invention the mixed saturated and unsaturated hydrocarbons are subjected to a series of treatments, each of which is conducted under conditions best suited for the production of gasoline polymers from the gas mixture as it is composed when it is subjected to that particular treatment.

To be specific, the first treatment of the series is conducted under conditions best adapted to the production of gasoline polymers from the higher olefinic content of the initial gas mixture. The resulting gas mixture, after separation of the polymers produced, contains saturated hydrocarbons having one to four carbon atoms and ethylene, which is substantially unaffected in the first stage, together with some propylene.

The gas mixture is then subjected to cracking under conditions favoring the conversion of the higher saturated constituents into a maximum yield of unsaturates. After separation of hydrogen and any hydrogen sulfide formed, which may be omitted but is preferably included, the gas mixture is subjected to a treatment suitable for polymerizing ethylene as well as the higher olefins. The gas mixture resulting from this treatment, after separation of the polymers formed, is composed mainly of methane, ethane, and some propane, and, in some instances, ethylene. This mixture is then subjected to a high temperature open tube or catalytic treatment suitable for the conversion of methane, ethane, etc. into liquid aromatic hydrocarbons.

In the first polymerization the gas mixture is subjected to the action of a catalyst, such as 60–80% sulfuric acid, phosphoric acid, AlCl$_3$ on silica gel, Floridin clay, alumina-silica, BF$_3$, or the like, which functions at temperatures between about 150° F. and 450° F., depending on the activity of the catalyst used, and under a pressure ranging from about 20 to 600 lbs. per square inch. The time of contact is preferably kept at 10 to about 100, or even as high as 300 seconds. The gasoline produced is predominantly aliphatic and is olefinic in character.

This polymerization step is preferably conducted under such conditions of temperature and pressure that at least the three and four carbon atom hydrocarbons are in the liquid phase. If desired, the gaseous constituents of the initial material under the pressure employed for this polymerization step may be by-passed around the polymerization chamber and joined with the gaseous products of the polymerization chamber prior to the cracking step. By operating under pressure, of the order mentioned in this polymerization step, the application of heat to the product is necessary in order to separate, by fractionation, the unpolymerized constituents from the polymers issuing from the polymerization chamber where the heat of reaction has not raised the temperatures sufficiently for this purpose. This addition of heat is advantageous to the process as a whole, since the subsequent steps are conducted at higher temperatures and any heat added is utilized.

The following step, that is, the cracking step, is conducted at a temperature between about 900° F. and 1550° F. (preferably at a temperature and time of contact to give a maximum conversion to olefins) and under atmospheric or elevated pressure, which may be the same as that employed in the first polymerization. The time of contact is 0.1 to 0.5 or 1, even up to 5 or 20 seconds, the time increasing with decrease in cracking temperature employed. While this step may be replaced by catalytic dehydrogenation at temperatures ranging from 800 to 1100° F. in the presence of a catalyst, such as one containing an oxide of a metal of group VI of the periodic system in conjunction with other difficultly reducible oxides, such as alumina, and under atmospheric or slightly elevated pressure, the pressure cracking is by far to be preferred for practical purposes, since, when the latter step is employed, no drop in pressure between the polymerization step and it is necessitated whereby compression losses are avoided.

The next step involving a second polymerization is usually conducted at a temperature between about 600° F. and 1100° F. and under a pressure ranging from about 600 lbs. to about 4000 lbs. per sq. in. These conditions, especially when a pressure near the upper end of the specified range is employed, are very favorable to the polymerization of ethylene. If, however, this step were employed as the initial step of the process, the concentration of higher olefins, as compared to that of ethylene, would be so great that the higher olefins would suffer decomposition and polymerization to undesirable high boiling products. At the stage of the process in which this treatment is employed, according to the present invention, however, the concentration of ethylene in the gas mixture predominates over that of any of the higher unsaturates, whereby practical conversions of ethylene into higher boiling substantially cyclic compounds boiling in the gasoline range are attainable, and, at the same time, the diluent effect of the other components of the gas mixture protects the higher olefins against excessive decomposition whereby they, in turn, may be converted to a large extent into higher boiling polymers of a cyclic nature.

In this second polymerization step no catalyst or contact mass is required. The duration of the treatment should be at least about 15 minutes, if appreciable yields are to be obtained. The yield of substantially naphthenic polymers from ethylene under the conditions mentioned increases with the duration of treatment. Thus, the only upper limit is that dictated by practicability. In general, the treatment should not be conducted for more than an hour, preferably about 30 minutes. The higher the pressure the lower should be the time of contact. Since the polymers formed are mainly naphthenic in character, and are quite stable under these conditions, no serious loss of yield results from extending the duration of treatment. If desired, a mild polymerization catalyst, such as clay, bauxite, silica gel, zinc chloride, and the like, may be present to facilitate more rapid polymerization.

The third and final polymerization is preferably conducted in the absence of carbon forming substances, or in the presence of a catalyst having a tendency to reduce carbon formation such as silicon, or any of the catalysts mentioned in U. S. Patents 1,893,804, 1,766,718, 1,884,093, 1,851,726 and 1,894,255. For example the temperature will usually be between about 1300° F. and about 2200° F., depending upon the composition of the gas mixture, being higher, the greater the percentage of methane in the gas mixture. The pressure employed will be preferably atmospheric although higher pressure, such as 2, 5, 10, 50 or more atmospheres, or the pressure prevailing throughout the system, or a higher pressure may be employed, especially with internally heated reactors. In some cases it is desirable to conduct this polymerization at a sufficiently high pressure, such as that maintained in the previous polymerization step, to facilitate fractionation of the product. The gases from this step may be absorbed by oil or charcoal to remove gasoline hydrocarbons. The gasoline polymers produced in this stage are predominately aromatic in character.

One of the chief attributes of the combination of steps constituting the present invention is the manner in which heat is used to the best advantage. No extrinsic cooling is required between the first and second stages, and any heat supplied, either as heat of reaction or as heat necessary for the separation of the products of the first stage, is utilized in the second stage. Some withdrawal of heat is necessary between the second and third stages in order to permit the removal of hydrogen when desired. This heat is retained, in part, in the process, however, by suitable heat exchange between either the products of the first and second stages or the second and third stages. Moreover, this withdrawal of heat from the products of the second stage adjusts the temperature of these products in such a manner as to bring it within the range suitable for the second polymerization. Any heat evolved in the second polymerization is utilized in the third polymerization which is conducted at a higher temperature.

Another point of merit of the process of the present invention is the fact that, from a given gas mixture, three types of gasoline of distinct character are obtained as distinguished from a single gasoline of fixed composition. As a result, a source of a blending agent of each of the three main classes of hydrocarbons found desirable in gasoline is made available to the refinery. These various types may be blended with each other in such a manner as to produce a gasoline having a composition especially suited to meet a given set of specifications. For instance the following motor fuel blends may be obtained from refinery gases:

| Gas | Motor fuel | | |
| --- | --- | --- | --- |
| | First step olefinic | Second step naphthenic | Third step aromatic |
| | Percent | Percent | Percent |
| Refinery | 50 | 40 | 10 |
| Do | 40 | 55 | 5 |
| Do | 20 | 65 | 15 |
| Gyro | 70 | 20 | 10 |
| Do | 60 | 35 | 5 |

For multi-cylinder engines a very excellent fuel, giving a high road octane rating, is prepared according to this invention by maintaining conditions so as to obtain a motor fuel product 30–50% of which is made in the first stage, 65–35% of which is made in the second polymerization stage and 5–15% of which is prepared in the third polymerization stage.

Furthermore, by the procedure described, it is possible to treat a mixture containing olefins and saturates of 1–4 carbon atoms, such as that generally found in most refineries, so as to obtain the maximum possible yield of liquid fuel from all of the hydrocarbons, in substantially a single pass, with minimum loss to discarded fuel gas and coke. This has not heretofore been accomplished by any proposed process of polymerization.

Due to its flexibility, various expedients for the fullest utilization of the hydrocarbon constituents of the initial material are contemplated by the present invention. For example, in cases where the product of the cracking step contains especially large quantities of propylene and butylenes, all of this gas, or a substantial portion of it, may be recycled to the first polymerization for further conversion to gasoline polymers of the olefinic type. Again, the composition of the gas mixture resulting from the cracking stage may contain such large percentages of methane and ethane, and such small percentages of ethylene and propylene, as to make it advantageous to pass this gas directly to the third polymerization stage from which any ethylene and propylene recovered is recycled to the second polymerization stage.

In some cases it is desirable to convert the naphthenic polymers, obtained in the second polymerization stage, to aromatics by dehydrogenation in a known manner, such as by the use of the catalysts and the operating conditions mentioned above, with relation to the alternative treatment for the cracking stage. The hydrogen so evolved may be advantageously employed for the hydrogenation of the olefinic polymers resulting from the first stage.

A preferred mode of operation, according to the present invention, will be described in conjunction with the accompanying drawing in which is illustrated in diagrammatic form, partly in section, a front elevation of an apparatus suitable for use according to the present invention.

Referring to the drawing in detail, a typical refinery stabilizer charge containing methane, ethylene, ethane, propane, propylene, butane, iso- and normal, and butylene, iso- and normal, is introduced into the plant through line 1 into compressor 2 in which a pressure, sufficiently high to maintain propane and butane and their corresponding olefins in the liquid state at a temperature suitable for catalytic polymerization to olefinic polymers, is applied. In most cases a pressure of about 500 lbs. per sq. in will be sufficient. If valve 3, in line 1, is closed, and valve 4, in line 5, is open, the compressed initial material is fed directly into chamber 6 containing a polymerization catalyst, such as phosphoric acid on kieselguhr, or on charcoal, maintained at a temperature between about 150° F. and 450° F. In the event that sulfuric acid is employed as the catalyst, the direction of flow of the reaction material in chamber 6 will be upwardly. Alternatively, valve 4 may be closed and valve 3 open, in which case the compressed initial material passes into the separating chamber 7 having a heating coil 8 and a cooling coil 9 in the usual manner and provided, if desired, with internal construction, such as baffle plates or discs and doughnuts. In this manner ethane, ethylene and methane pass off through line 10 and liquid higher hydrocarbons are withdrawn through line 11 and fed to chamber 6.

The products from chamber 6 are conducted through line 12 into heat exchanger 13 in which they are in indirect heat exchange relation with the reaction products from the subsequent cracking step as hereinafter and more fully described.

The reaction products are then introduced into evaporator 14 provided with a heating coil 15 and a cooling coil 16, and, if desired, with interior construction for fractionating purposes.

The monomeric hydrocarbons leave chamber 14 through line 17 in which they are conducted to cracking chamber 18, after being combined with the like constituents of the initial material by-passed through line 10, in case this expedient is employed, and passed through the heat exchanger 19 in heat exchange relation with the products of the final polymerization step as hereinafter more fully described. The reaction chamber 18 may be filled with a catalyst having a splitting action at the temperature maintained therein which, in this case, is 1250° F. As a suitable filling material may be mentioned adsorbent clay.

The cracking products leave chamber 18 through line 20 and pass through heat exchanger 13, as previously mentioned, from which they are withdrawn through line 21 and conducted to a chamber 22 filled with cupric oxide and held at a temperature of about 598° F. The cupric oxide reacts with the hydrogen in the cracking products to form water. Chamber 22 is provided with an inlet 23 and an outlet 24, each provided with a valve. Likewise line 21 is provided with a valve 25 and line 26, for conducting reaction gases from chamber 22, is provided with a valve 27. By closing valves 25 and 27, and opening valves 23 and 24, chamber 22 may be blown with air for the regeneration of cupric oxide.

As an alternative for the removal of hydrogen by reaction of cupric oxide chamber 22 may be filled with any filling material such as pumice stone. Valves 25 and 27 may be kept open, outlet 24 shut off, and sulfur dioxide, nitrogen peroxide, or any other gaseous oxide capable of reacting with hydrogen at a temperature above about 500° F., may be introduced through inlet 23.

The cracking products leaving chamber 22 through line 26 are introduced into another chamber 28 which may be packed with a contact mass 29 composed of luxmass (hydrated iron oxide), or any other contact mass containing a metal oxide which will react with hydrogen sulfide to form water and sulfur. Alternatively, the packing material may consist of porcelain balls, or fragments of stoneware or glass, and a wash liquid, such as caustic soda, may be introduced through spray-head 30 and withdrawn through tray 31 through outlet 32.

The gas mixture leaving chamber 28 through line 33 will be composed of a mixture of hydrocarbons with water vapor and perhaps some sulfur. This mixture is passed to line 34 which is provided with valves 35 and 36. By proper manipulation of these valves all, or part, of this gas mixture, depending on its composition, is recycled back to line 1 for further contact with the catalyst in chamber 6, or is conducted through heat exchanger 37 in which it is passed in heat exchange relation with the products of the final polymerization step, as will hereinafter be explained, and is then compressed by compressor 38 to a pressure suitable for the second polymerization, which, in this case, is approximately 2120 lbs. per sq. in. In line 34 is a valve 39 which may be manipulated to by-pass all or part of the compressed gas mixture resulting from the cracking step through line 40, which is also provided with a valve 41 for this purpose, into the third polymerization zone.

With valve 39 fully open and valve 41 closed, the cracking products pass through a heating coil 42 in which they are raised to a temperature of approximately 782° F. and are then introduced into chamber 43 which may be empty or filled with a suitable contact material or mild polymerizing catalyst, such as clay, bauxite, and the like, and which is maintained by suitable external heating at a temperature of 810° F. The velocity of flow is adjusted so that the reaction material remains in this chamber about 25 minutes. Boron fluoride, or other gaseous polymerization agents may be introduced into this chamber.

The reaction products from chamber 43 pass through a temperature control coil 44 in which their temperature may be raised or lowered to a temperature suitable for the separation of normally gaseous constituents from the liquid constituents. The products are then discharged into evaporator 45 provided with a heating coil 46 and a cooling coil 47 in the usual manner. The gaseous products leave chamber 45 through line 48 and pass into polymerization chamber 49, after being brought to the desired temperature in heating coil 50. Chamber 49 is filled with lumps 51, of silicon, or other suitable catalytic material, and is maintained at a temperature of 1750° F. and under a much lower pressure than that maintained in chamber 45, as, for example, 50–400 lbs. or even atmospheric pressure. The products leaving chamber 49 through line 52 pass into a separator 53 in which tar is deposited and withdrawn through line 54. The remaining vaporous reaction products pass through line 55 into a Cottrell precipitator 56 having an electrode 57 in which carbon particles are removed from the gas mixture.

The hot gases issuing from the precipitator 56 through line 58 pass first through heat exchanger 19, in which they give up a large amount of their sensible heat to the feed stock for the cracking chamber 18, and then through line 59 into heat exchanger 37, in which they give up a further amount of heat to the feed stock for the second polymerization unit, and finally through line 60 through a temperature-regulating coil 61 into evaporator 62 containing a heating coil 63 and a cooling coil 64. Polymers of an aromatic nature are withdrawn from evaporator 62 through line 65. Normally gaseous products containing some ethylene and propylene, leave evaporator 62 through line 66 and are either discharged to burners by opening valve 67, or, with valve 67 closed, are fed through line 68 controlled by valve 69 through a hydrogen removal chamber 70, similar to chamber 22, and thence back to the second polymerization chamber 43. Due to the high hydrogen content of these off gases, however, it is preferable to use them for hydrogenation in the manner hereinafter described.

As has already been mentioned, a portion or all of the naphthenic polymers from chamber 43 may be dehydrogenated to aromatics, and the evolved hydrogen may be used in the hydrogenation of the olefinic polymers from polymerization chamber 6. To this end evaporator 45 is provided with a draw-off line 71 fitted with a pressure release valve 72. The naphthenic polymers may be passed to storage through valve 73, or passed through valve 74 and preheater 75 to a chamber 76 filled with a dehydrogenation catalyst 77 composed of chromium oxide and alumina, or one containing chromium, zinc and lead on magnesia, or one comprising metals or oxides or sulfides of group II or III, chamber 76 being maintained at a temperature of about 1000° F. The reaction products leave chamber 76 through line 78 and are fed to a separator 79 provided with a cooling coil 80 from which aromatic gasoline hydrocarbons are withdrawn through outlet 81, and the hydrogen, together with gaseous hydrocarbons formed in amounts of 2-8%, are withdrawn through line 82 and conducted to the hydrogenation zone discussed below.

Evaporator 14 is provided with a draw-off line 83 and fitted with a pressure release valve 84 whereby the olefinic polymers condensed in chamber 14 may be passed to a hydrogenating chamber 85 containing a hydrogenating catalyst 86, such as nickel alone, or in conjunction with alumina or metals, oxides or sulfides of group VI, or copper chromite. The hydrogen recovered from separator 79 through line 82 is introduced into the olefinic polymers in line 83 and is supplemented by an addition of extraneous hydrogen, if required, through line 87. The reaction products from chamber 85 are discharged into separator 88 from which saturated gasoline hydrocarbons are withdrawn through line 89 and condensible material is withdrawn through line 90.

In order to take advantage of the high hydrogen content of the gases leaving evaporator 62, line 68 is provided with a bypass 91 through which, by manipulation of valves 92 and 93, the gases of hydrogen content may be bypassed around the hydrogen removal chamber 70 and then conducted to line 82 by suitable manipulation of valves 94 and 95.

It is apparent that many changes may be made in the procedure described above without departing from the scope of the present invention. For example, the removal of hydrogen and the hydrogen sulfide at the various points indicated may be dispensed with without detracting appreciably from the practicability of the process. Again, the products leaving chamber 49 may be quenched with water or oil before being passed through the Cottrell precipitator, which, in turn, may be replaced by an adsorbent mass such as charcoal. In full plant scale operation it may be advisable to include additional heating coils at appropriate points since heat loss by radiation on full scale operation is very much greater than in experimental apparatus. It is also to be understood that, while in the various catalytic chambers the catalyst is illustrated as being in lump form, it may be present in any desired physical state. In addition, it is to be noted that in the second polymerization chamber a small amount of oxygen may be introduced with the initial material in order to initiate polymerization in a known manner as described in U. S. Patent 1,981,819.

The nature and objects of the present invention having been thus described and illustrated by a preferred embodiment of the same, what is claimed as new and useful and desired to be secured by Letters Patent is:

1. A process for the conversion into valuable low boiling liquid products of a mixture of normally gaseous hydrocarbons ranging from methane to butane and including substantial amounts of propylene and butylenes, which comprises contacting the mixture with a polymerization catalyst of the class typified by phosphoric acid at a temperature between about 150° F. and 450° F. under an elevated pressure of 100 to 600 lbs. per sq. in., removing the polymers so formed boiling within the gasoline range and higher, subjecting the resulting mixture of gases to cracking at a temperature between about 900° F. and 1550° F., passing the cracked products through a polymerization zone maintained at a temperature between 600° F. and 1100° F. and under a pressure ranging from 600 lbs. per sq. in. to 4000 lbs. per sq. in., removing the polymers so formed boiling within the gasoline range and higher, and subjecting the resulting gas mixture to a temperature between 1300° F. and 2200° F. at substantially atmospheric pressure in the absence of carbon forming substances, and recovering the polymers so formed boiling within the gasoline range and higher.

2. In a process in which a mixture of normally gaseous hydrocarbons, ranging from methane to butane and including substantial amounts of propylene and butylenes, is subjected to the action of a polymerization catalyst of the class typified by phosphoric acid at a temperature between about 150° F. and 450° F. under an elevated pressure of 100 to 600 lbs. per sq. in. for the production of liquid polymers, the polymers are removed, the resulting mixture of gases is subjected to cracking at a temperature between about 900° F. and 1470° F., the cracked products are cooled, purified and subjected to polymerization at a temperature between 750° F. and 1050° F. and under a pressure ranging from 600 lbs. per sq. in. to 3000 lbs. per sq. in. for the production of liquid polymers, the polymers so formed are removed and the resulting gas mixture is subjected to a temperature between 1300° F. and 2000° F. to form a further quantity of liquid polymers, the step of conducting the products obtained from the last polymerization step into indirect heat exchange relation with the gaseous mixture fed to the cracking operation, and then into indirect heat exchange relation with the gaseous mixture fed to the second polymerization step and then to a separator for the recovery of liquid polymers.

3. A process according to claim 1 in which the polymers obtained in the second polymerization step are subjected to catalytic dehydrogenation and the hydrogen so obtained is chemically combined with the polymers obtained in the first polymerization stage by the action of a hydrogenation catalyst under suitable conditions.

4. A process for the production of liquid hydrocarbons of the gasoline boiling range from a mixture of normally gaseous hydrocarbons ranging from methane to butane and including relatively small amounts of butylenes and larger amounts of propylene and ethylene, which comprises subjecting said gas mixture to cracking at a temperature between about 900° and 1470° F., passing the cracked products through a polymerization zone maintained at a temperature between 750° F. and 1050° F. and under a pressure ranging from 600 lbs. per sq. in. to 3000 lbs. per sq. in., removing the polymers so formed boiling within the gasoline range and higher, and subjecting the resulting gas mixture to a temperature between 1300° F. and 2200° F. at substantially atmospheric pressure in the absence of carbon forming substances, and recovering the polymers so formed boiling within the gasoline range and higher.

5. A process according to the preceding claim in which the products of the last stage, while still in the vapor form, are passed into heat exchange relation with the initial material for the first stage and then with the initial material for the second stage, and are then subjected to condensation for the recovery of liquid polymers.

6. A process for the conversion into valuable low boiling liquid products of a mixture of normally gaseous hydrocarbons ranging from methane to butane and including substantial amounts of propylene and butylene, which comprises contacting the mixture with a polymerization catalyst of the class typified by phosphoric acid at a temperature between about 150° F. and 450° F. and under an elevated pressure of 100 to 600 lbs. per sq. in., removing the polymers so formed boiling within the gasoline range and higher, subjecting the resulting mixture of gases to cracking at a temperature between about 900° F. and 1550° F., passing the cracked products through a polymerization zone maintained at a temperature between 600° F. and 1100° F. and under a pressure ranging from 600 lbs. per sq. in. to 4000 lbs. per sq. in., and removing the polymers so formed boiling within the gasoline range and higher.

7. A process according to claim 1 in which the products of the first polymerization stage prior to the removal of liquid polymers therefrom are passed into heat exchange relation with the products of the cracking stage and after separation of the liquid polymers therefrom into heat exchange relation with the products of the final polymerization stage.

8. A process according to claim 1 in which the liquid naphthenic polymer recovered from the second polymerization stage is subjected to catalytic dehydrogenation and the fixed gases so produced are combined with normally gaseous products of the final polymerization stage and the mixture reacted with the olefinic liquid polymers produced in the first polymerization stage in the presence of a hydrogenation catalyst at a temperature suitable for the hydrogenation of said polymers.

PETER J. WIEZEVICH.